United States Patent Office 2,940,738
Patented June 14, 1960

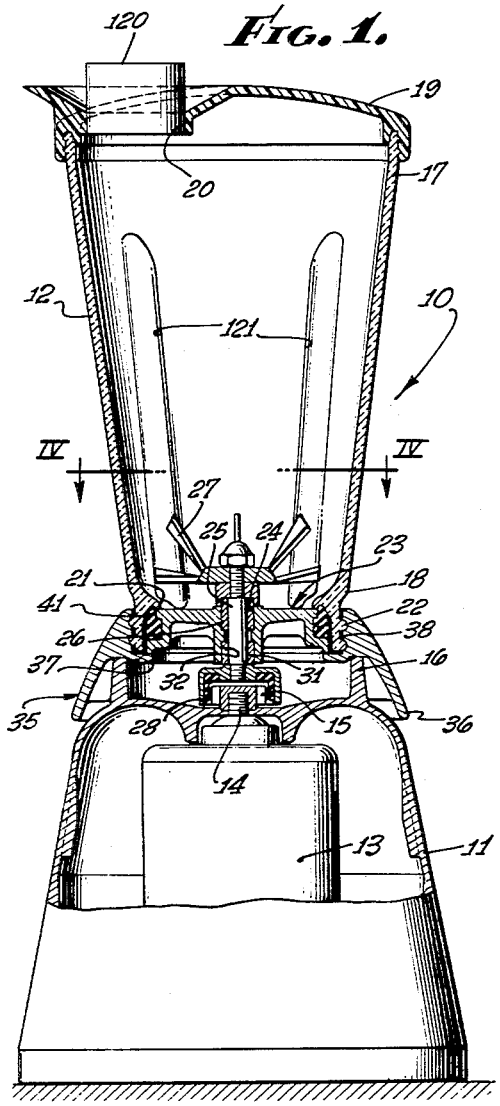

2,940,738
MIXING DEVICE RECEPTACLE CONSTRUCTION

Armand L. A. Posener, Los Angeles, Calif., and Austin E. Elmore, Mexico City, Mexico, assignors to Kitchen Master Appliances, Inc., Los Angeles, Calif., a corporation of California Filed Nov. 25, 1957, Ser. No. 698,456

7 Claims. (Cl. 259—107)

The present invention relates to a mixing device receptacle construction having a detachable bottom wall to enable the user to clean the mixing means extending vertically through the bottom wall.

Mixing devices are widely used in homes as well as in commercial establishments for preparing emulsified liquids or juices from raw vegetables or fruits, dicing raw vegetables or fruits for salads or the like, agitating or mixing solids and liquids into a substantially homogeneous mixture, and other uses depending upon the imagination of the user. In all of these mixing devices, a receptacle must be provided to receive the solids and liquids that are to be mixed. Generally, the receptacle is made of substantially rigid material such as glass, metal or suitable plastic such as styrene and is a single unit or made in one piece having vertically or slightly conically extending side walls and a bottom wall, the side walls desirably including indented or fluted portions to facilitate the mixing or blending operation. The upper end of the receptacle is generally open and is adapted to be closed by a cover or the like during operation. The bottom wall of the receptacle generally has a central opening therein adapted to receive a vertical, upwardly extending driving shaft which has mixing means, such as blades or agitators, fixed on the upper end thereof. The receptacle, the driving shaft and the mixing means form a single unit which is adapted to be mounted on the base of the mixing device during the mixing operation and can be easily removed from the base in order to pour the mixed contents out of the receptacle.

After the receptacle has been used, it is generally desired to clean it thoroughly before using it for the next mixing operation. Cleaning is difficult and somewhat dangerous, particularly since the mixing means normally include sharp cutting elements. To facilitate cleaning it is desirable to provide easy access to the cutting elements. If a demountable or detachable bottom wall is provided to accomplish this, it is essential that the construction be such that the closure of the bottom wall with the side walls will not become loosened or opened by the vibration of the device in operation. Moreover, since the mixer may be used with liquids such as citrus juices it is desirable that the possibility of contact by such liquids with a rubber or other resilient gasket be minimized to prevent deterioration of the gasket and contamination of the liquid. Hence a closure should include means providing firm abutting contact between relatively rigid materials.

To overcome the disadvantages in the mixing devices heretofore used, generally speaking the present invention provides a mixing device having at least one vertically extending driving shaft and mixing means fixed on the upper end of the shaft, a substantially vertical upwardly extending hollow receptacle positioned about the mixing means and having an upper end and an open lower end which extends below the mixing means, a substantially horizontal bottom wall sealingly mounted about the shaft below the mixing means and having its outer edge sealingly engaging the lower end of the receptacle, and detachable means for clamping the bottom wall into sealing engagement with the lower end of the receptacle. The bottom wall as seen in section, is desirably formed to include vertically spaced, horizontally laterally extending flange portions which are adapted to be slightly deformed under clamping pressure in order to exert frictional locking force on the threaded engagement of the structure. In addition resilient gasket means may be provided for assisting in preventing the clamping means from becoming unclamped. With this structure, it is readily seen that the receptacle can be easily detached from the bottom wall leaving the mixing means exposed and therefore they can be readily cleaned with a minimum of danger of cutting or injuring the fingers of the person who is cleaning the receptacle.

An object of the present invention is the provision of a novel mixing device receptacle construction which can be easily cleaned.

Another object is to provide a mixing device receptacle construction having a detachable bottom wall to enable the user to clean the mixing means extending vertically through the bottom wall.

Another object is to disclose such a structure which virtually elminates inadvertent loosening of the parts despite the substantial vibration characteristic of a power operated food mixing device.

A further object of the invention is the provision of a mixing device having a receptacle with a detachable bottom wall which is economical to produce, easy to use, and which minimizes the danger that a person who is cleaning the receptacle may cut his hands.

Other objects and many of the attendant advantages of this invention will be readily appreciated as the same becomes better understood by reference to the following detailed description when considered in connection with the accompanying drawings wherein:

Fig. 1 shows a vertical section view, along a central plane of a mixing device of a preferred embodiment of the invention;

Fig. 2 is an exploded sectional view of the lower end of the receptacle, the bottom wall, and the clamping means.

Fig. 3 is a side elevational view showing the device of the present invention removed from its power base and resting upon the flanged skirt of the clamp.

Fig. 4 is a sectional view taken along line IV—IV of Fig. 1.

Referring now to the drawings, wherein like reference characters designate like or corresponding parts throughout the several views, there is shown in Fig. 1 (which illustrates a preferred embodiment) a mixing device 10 having a base indicated generally at 11 which is adapted to receive at its upper end a receptacle or container indicated generally at 12. The base 11 may have substantially vertical walls which house a driving means, such as a motor 13, provided with an upwardly extending driving shaft 14 having one part 15 of a splined coupling connected thereto. Upwardly directed shoulders 16 may be provided on the upper end of the base 11 to support the receptacle 12 in a manner hereinafter to be described.

Receptacle 12, made of relatively rigid material such as metal, glass, suitable plastic such as styrene or the like, has side walls terminating upwardly in open upper end 17 and open lower end 18. Upper end 17 is provided with a removable cover 19 of somewhat flexible plastic material which desirably affords a substantially hermetically tight threaded seal with the side wall, the cover including an outlet opening 20 closable by a plug member 120. The lower end 18 of the receptacle includes an inwardly projecting annular lip 21 and external threads 22 below and outwardly of the lip. Desirably the side walls include a plurality of angularly spaced inwardly projecting indentations or fluting 121 extending vertically for a substantial portion of the height of the receptacle to facilitate mixing or blending during operation.

The open lower end 18 of the receptacle may be closed by a substantially horizontal bottom wall indicated generally at 23 having its edges sealingly engaging the lower end of the receptacle by abutting against the sealing lip 21. A central opening 24 is provided in the bottom wall 23 and is adapted to receive a vertically extending drive shaft extension 25. Suitable sealing means or bushing 26 may be provided between the drive shaft extension 25 and the walls of the opening 24 in the bottom wall 23 to prevent fluid particles or the like from leaking out of the receptacle. It should be understood that the drive shaft 25 may rotate within the opening 24 while the bottom wall 23 remains stationary. Suitable mixing means, such as blades or agitators 27, may be fixed on the upper end of the drive shaft extension 25 in order to mix the materials which are placed within the receptacle 12. The lower end of the drive shaft extension 25 may be provided with a complementary female splined part 28 adapted to engage the splined part 15 which is driven by means of the motor 13. When the splined parts 15 and 28 are assembled as shown in Fig. 1, it can be seen that they constitute a coupling by which mixing means 27 may be rotated. A lower bushing 31 is housed in opening 32, shaft 25 being journaled in bushings 26 and 31.

The outer edge of the bottom wall 23 may be provided with upper and lower vertically spaced, horizontally extending flanges 33 and 34, respectively, the upper flange 33 being in sealing engagement with the lip 21. The outer edge of the lower flange 34 may horizontally extend beyond the outer edge of the upper flange 33. The bottom wall may be made of any suitable material inert to food to be treated in the present device, preferably a synthetic material such as nylon.

Detachable means indicated generally at 35 may be provided for clamping the bottom wall 23 into sealing engagement with the lower end of the receptacle 12 or more specifically with the sealing lip 21. The clamping means 35 may include a lower skirt 36 which may be of any desired shape, having downwardly extending walls which extend beyond the lower end of the spline connection 28, for reasons to be hereinafter described. The clamping means may include an internal, horizontally extending annular shoulder 37 which is adapted to abuttingly engage the lower flange 34 of the bottom wall 23 and thread means 38 for engaging the threads 22 on the receptacle lower end 18. It can thus be understood, as the clamping skirt 36 is screwed upwardly on the lower end 18 of the receptacle, that the shoulder 37 engages the lower flange 34 of the bottom wall 23 and forces the upper flange 33 of the bottom wall 23 into sealing engagement with the sealing lip 21 of the receptacle 18. This construction provides a seal between the lower end of the receptacle 18 and the bottom wall 23 and prevents any liquids or particles from leaking out of the receptacle during the mixing operation. Desirably the parts are threaded together with sufficient force to at least slightly deform the flanges 33 and 34 toward one another, thereby providing frictional binding engagement between threads 22 and 38.

In view of the severe vibration conditions existing during operation of the present device, it may be desirable to provide resilient gasket means in the annular cavity between flanges 33 and 34. In the present illustration such a gasket is indicated at 41, and serves both to prevent any possibility of leakage of liquid downwardly from the receptacle and also to provide additional frictional binding force for the threads 22 and 38. The gasket 41 may be made of any suitable resilient material, but preferably it is made of neoprene. As best seen in Fig. 1, the gasket extends between the upper flange 33 of the bottom wall 23 and the lower end of the receptacle 18 in order to exert an upward pressure on the lip 21. The lower end of the gasket 41 exerts a downward pressure on the lower flange 34 thus forcing the clamping skirt 36 downwardly. Desirably the lower flange 34 of wall 23 extends outwardly substantially farther than upper flange 33, so that an annular seat is provided on the lower surface of lip 21 for abutting contact by gasket 41.

After the mixing operation has been completed, the operator need only pull upwardly on the receptacle 12 with one hand while holding the base 11 stationary with the other hand and remove the unit (receptacle 12, wall 23, clamp 35, mixing means 27) from the shoulders 16 of base 11. The receptacle 12 is then adapted to be very easily detached from the base 11 and because the lower ends of the skirt 36 extend below the lower end of the splined connection 28, the receptacle 12 can be placed on a table or the like upon the lower end of the skirt 36 which act as legs, as appears in Fig. 3.

After the contents within the receptacle 12 have been poured out, the receptacle is now ready to be cleaned. The operator need only unscrew the clamp 35 and the hollow receptacle 12 may then be pulled upwardly, thus exposing the mixing means 27. Any particles or other matter which have become lodged within the mixing means 27 can thus be easily cleaned by any suitable brush means or the like with little danger of injuring the operator's hands or fingers. After the cleaning operation, the receptacle 12 is placed on top of the bottom wall 23 until the lip 21 rests on the edges of the bottom wall 23 and the clamp 35 is then screwed upwardly on the threads 22 until the finger 37 engages the lower flange 34 of the bottom wall 23. The clamp 35 is tightened upwardly until the proper seal is obtained between bottom wall 23 and lip 21.

Obviously many modifications and variations of the present invention are possible in the light of the above teachings. It is therefore to be understood that within the scope of the appended claims the invention may be practiced otherwise than as specifically described.

We claim:

1. In combination with a mixing device having a vertically extending driving shaft and mixing means fixed on the upper end of the shaft, a substantially vertical, upwardly extending hollow receptacle positioned about said mixing means and having an open upper end and an open lower end extending below the mixing means, said receptacle lower end having external threads thereon and an internal, horizontally extending sealing lip vertically spaced from the lower edge thereof; a substantially horizontal bottom wall sealingly mounted about said shaft below the mixing means and comprising upper and lower vertically spaced, horizontally extending flanges, the upper flange having its outer edge sealingly engaging said sealing lip; and detachable means for clamping said bottom wall into sealing engagement with said lip, including an internal, horizontally extending shoulder engaging the lower flange of the bottom wall and threaded means for threadedly engaging the threads on said receptacle lower end.

2. The invention as stated in claim 1 including annular resilient gasket means disposed between said flanges.

3. The combination as set forth in claim 2, wherein the outer edge of the lower flange extends horizontally beyond the outer edge of the upper flange, whereby said gasket means abuts an annular portion of said lip.

4. The combination as set forth in claim 2, wherein said gasket means is made of neoprene.

5. In combination with a mixing device having a vertically extending driving shaft and mixing means fixed on the upper end of the shaft, a substantially vertical, upwardly extending hollow receptacle positioned about said mixing means and having an open upper end and an open lower end which extends below the mixing means, said receptacle lower end being cylindrical and having an internal, horizontally extending sealing lip and external threads thereon; a substantially horizontal bottom wall sealingly mounted about said shaft below the mixing means and having its outer edge sealingly engaging said sealing lip; and detachable means for clamping said bottom wall into sealing engagement with said lip, the outer edge of said bottom wall comprising upper and lower vertically spaced horizontally extending flanges, the upper flange being in sealing engagement with said lip, said clamping means including an internal, horizontally extending annular shoulder engaging the lower flange of the bottom wall and thread means for engaging the threads on said receptacle lower end.

6. The combination as set forth in claim 5, wherein the edge of the lower flange extends horizontally beyond the edge of the upper flange and including compressible resilient means positioned within the space between said upper and lower wall flanges and engaging the lip on said receptacle and the lower wall flange.

7. In combination with a mixing device having a vertically extending driving shaft and mixing means fixed on the upper end of the shaft, a substantially vertical, upwardly extending hollow receptacle positioned about said mixing means and having an open upper end and an open lower end which extends below the mixing means, said receptacle lower end having an internal, horizontally extending sealing lip; a substantially horizontal bottom wall sealingly mounted about said shaft below the mixing means and having its upper outer edge sealingly engaging said sealing lip, said wall including an integrally formed outwardly extending annular flange spaced downwardly and outwardly from said edge; and detachable means abuttingly contactable with said flange for clamping said bottom wall into sealing engagement with said lip.

References Cited in the file of this patent

UNITED STATES PATENTS

| | | |
|---|---|---|
| 975,905 | Taylor | Nov. 15, 1910 |
| 1,974,195 | Rice | Sept. 18, 1934 |
| 2,530,455 | Forss | Nov. 21, 1950 |
| 2,804,289 | Schwaneke | Aug. 27, 1957 |

FOREIGN PATENTS

| | | |
|---|---|---|
| 178,436 | Austria | May 10, 1954 |
| 512,665 | Belgium | July 31, 1952 |